United States Patent
Lim (10) Patent No.: US 8,922,606 B2
(45) Date of Patent: Dec. 30, 2014

(54) ROTATIONAL POLYGON MIRROR HAVING CONVEX REFLECTION SURFACES AND LIGHT SCANNING UNIT EMPLOYING THE SAME

(75) Inventor: Heon-hee Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 194 days.

(21) Appl. No.: 13/064,799

(22) Filed: Apr. 15, 2011

(65) Prior Publication Data

US 2012/0050443 A1 Mar. 1, 2012

(30) Foreign Application Priority Data

Aug. 30, 2010 (KR) .................. 10-2010-0084187

(51) Int. Cl.
| | | |
|---|---|---|
| B41J 2/385 | (2006.01) | |
| G02B 26/12 | (2006.01) | |
| B41J 2/47 | (2006.01) | |
| G02B 5/09 | (2006.01) | |
| G02B 5/10 | (2006.01) | |

(52) U.S. Cl.
CPC ............... B41J 2/473 (2013.01); G02B 26/12 (2013.01); G02B 5/09 (2013.01); G02B 5/10 (2013.01)
USPC ......................................... 347/118

(58) Field of Classification Search
None
See application file for complete search history.

(56) References Cited

U.S. PATENT DOCUMENTS

| | | | | |
|---|---|---|---|---|
| 4,875,748 | A | * 10/1989 | Matsumoto et al. | 359/218.1 |
| 7,126,737 | B2 | * 10/2006 | Atsuumi et al. | 359/216.1 |
| 2005/0002077 | A1 | * 1/2005 | Hatakeyama et al. | 359/216 |
| 2006/0039058 | A1 | * 2/2006 | Mori | 359/216 |
| 2008/0239060 | A1 | * 10/2008 | Jo | 347/259 |

FOREIGN PATENT DOCUMENTS

| | | | |
|---|---|---|---|
| JP | 08-211319 | 8/1996 | |
| JP | 08211319 A | * 8/1996 | ............ G02B 26/10 |
| JP | 10-288747 | 10/1998 | |

* cited by examiner

*Primary Examiner* — Geoffrey Mruk
*Assistant Examiner* — Bradley Thies
(74) *Attorney, Agent, or Firm* — Staas & Halsey LLP (57) ABSTRACT

A rotational polygon mirror includes a plurality of reflection surfaces that rotate with respect to a rotation axis, wherein each of the reflection surfaces has a convex shape and a cross-sectional profile perpendicular to the rotation axis having at least two inflection points.

22 Claims, 6 Drawing Sheets

ROTATIONAL POLYGON MIRROR HAVING CONVEX REFLECTION SURFACES AND LIGHT SCANNING UNIT EMPLOYING THE SAME

CROSS-REFERENCE TO RELATED APPLICATIONS

This application claims the benefit of Korean Patent Application No. 10-2010-0084187, filed on Aug. 30, 2010, in the Korean Intellectual Property Office, the disclosure of which is incorporated herein in its entirety by reference.

BACKGROUND

1. Field

The embodiments relate to a rotational polygon mirror and a light scanning unit employing the same.

2. Description of the Related Art

Light scanning units that are employed in electrophotographic image forming apparatuses such as laser printers, digital photocopy machines, and facsimile machines deflect a light beam emitted from a light source to which an image signal is applied and scans the light beam in a main scanning direction of an image carrier. An electrostatic image is formed on an image carrier by using the light scanning unit in a main scanning direction and by migration of the image carrier in a sub scanning direction.

A light scanning unit includes a rotational polygon mirror that deflects a light beam emitted from a light source, wherein, in consideration of use and price, the rotational polygon mirror may be formed of various materials. Since a rotational polygon mirror deflects a scanned light beam onto an image carrier, a reflection surface of the rotational polygon mirror needs to be precisely processed.

SUMMARY

According to an aspect, there is provided a rotational polygon mirror including a plurality of reflection surfaces that rotate with respect to a rotation axis, wherein each of the reflection surfaces has a convex shape and a cross-sectional profile perpendicular to the rotation axis having at least two inflection points. Since the rotational polygon mirror has a convex shape, deterioration of performance of the rotational polygon mirror caused by deformation by a centrifugal force as the rotational polygon mirror rotates may be reduced.

Each of the plurality of reflection surfaces may have a cross-sectional profile $Y(X)$ that satisfies $Y(X)=AX^4+BX^2+C$, when a line from the center of the cross-sectional profile to a point on the rotation axis is the Y axis and a line perpendicular to the Y axis and passing through the point on the rotation axis is the X axis in a cross-section perpendicular to the rotation axis, wherein coefficients satisfy $0<\sqrt{(-B/6A)}<C\cdot\tan(180°/N)$, wherein N is the number of the reflection surfaces. For example, if the rotational polygon mirror includes four reflection surfaces, the coefficients of the cross-sectional profile $Y(X)$ may satisfy $0<\sqrt{(-B/6A)}<C\cdot\tan(45°)$. In this regard, the coefficients A, B, and C of the cross-sectional profile $Y(X)$ may be determined by physical properties and a rotation speed of the rotational polygon mirror.

A number of the plurality of reflection surfaces may be four. That is, the rotational polygon mirror may have four reflection surfaces. Also, a length of diagonal line of the rotational polygon mirror may be 20 mm, and a thickness of the rotational polygon mirror may be 2.5 mm.

Each of the plurality of reflection surfaces may have a cross-sectional profile $Y(X)$ which satisfies $Y_0-\Delta Y(X)-0.2\,\mu m \leq Y(X) \leq Y_0-\Delta Y(X)+0.2\,\mu m$, when a line from the center of the cross-sectional profile to a point on the rotation axis is the Y axis, and a line perpendicular to the Y axis and passing through the point on the rotation axis is the X axis in a cross-section perpendicular to the rotation axis, and a variation of the cross-sectional profile of the reflection surface deformed by a rotation with respect to a constant $Y_0$ that is a reference cross-sectional profile determined by physical properties of the rotational polygon mirror is $\Delta Y(X)$. Furthermore, each of the plurality of reflection surfaces may have a cross-sectional profile $Y(X)$ satisfying $Y_0-\Delta Y(X)-0.1\,\mu m \leq Y(X) \leq Y_0-\Delta Y(X)+0.1\,\mu m$. In this regard, the variation $\Delta Y(X)$ may satisfy $\Delta Y(X)=-AX^4-BX^2+Y_0-C$ and $0<\sqrt{(-B/6A)}<C\cdot\tan(180°/N)$, wherein N is the number of the reflection surfaces. Coefficients A, B, and C of the cross-sectional profile $Y(X)$ may be determined by physical properties and a rotation speed of the rotational polygon mirror.

The rotational polygon mirror may be formed of plastic. In this regard, the plurality of reflection surfaces of the rotational polygon mirror may be coated with a reflection layer. If a body of the rotational polygon mirror is formed of plastic with high reflectivity, a separate reflection layer may not be formed.

According to another aspect, there is provided a light scanning unit including: a light source that emits a light beam; a rotational polygon mirror that deflects the light beam emitted from the light source in a main scanning direction; and an imaging optical unit that images the light beam deflected by the rotational polygon mirror on a surface being scanned. In this regard, the rotational polygon mirror includes a plurality of reflection surfaces that rotate with respect to a rotation axis, wherein each of the reflection surfaces has a convex shape and a cross-sectional profile perpendicular to the rotation axis having at least two inflection points.

According to another aspect, there is provided an image forming apparatus including: a light scanning unit; a developing unit including a photoreceptor that is disposed at a region where an image is formed by the light beam emitted from the light scanning unit wherein an electrostatic latent image is formed on the photoreceptor, and a developing roller that develops the electrostatic latent image formed on the photoreceptor; and a transfer unit that transfers the image developed by the developing unit, wherein the light scanning unit includes a light source that emits a light beam; a rotational polygon mirror that deflects the light beam emitted from the light source in a main scanning direction; and an imaging optical unit that images the light beam deflected by the rotational polygon mirror on a surface being scanned. In this regard, the rotational polygon mirror includes a plurality of reflection surfaces that rotate with respect to a rotation axis, wherein each of the reflection surfaces has a convex shape and a cross-sectional profile perpendicular to the rotation axis having at least two inflection points.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, the present invention will now be described more fully with reference to the accompanying drawings, in which exemplary embodiments of the invention are shown. In the drawings, like reference numerals denote like elements, and size of each component is exaggerated for convenience and clarity.

Figure 1:
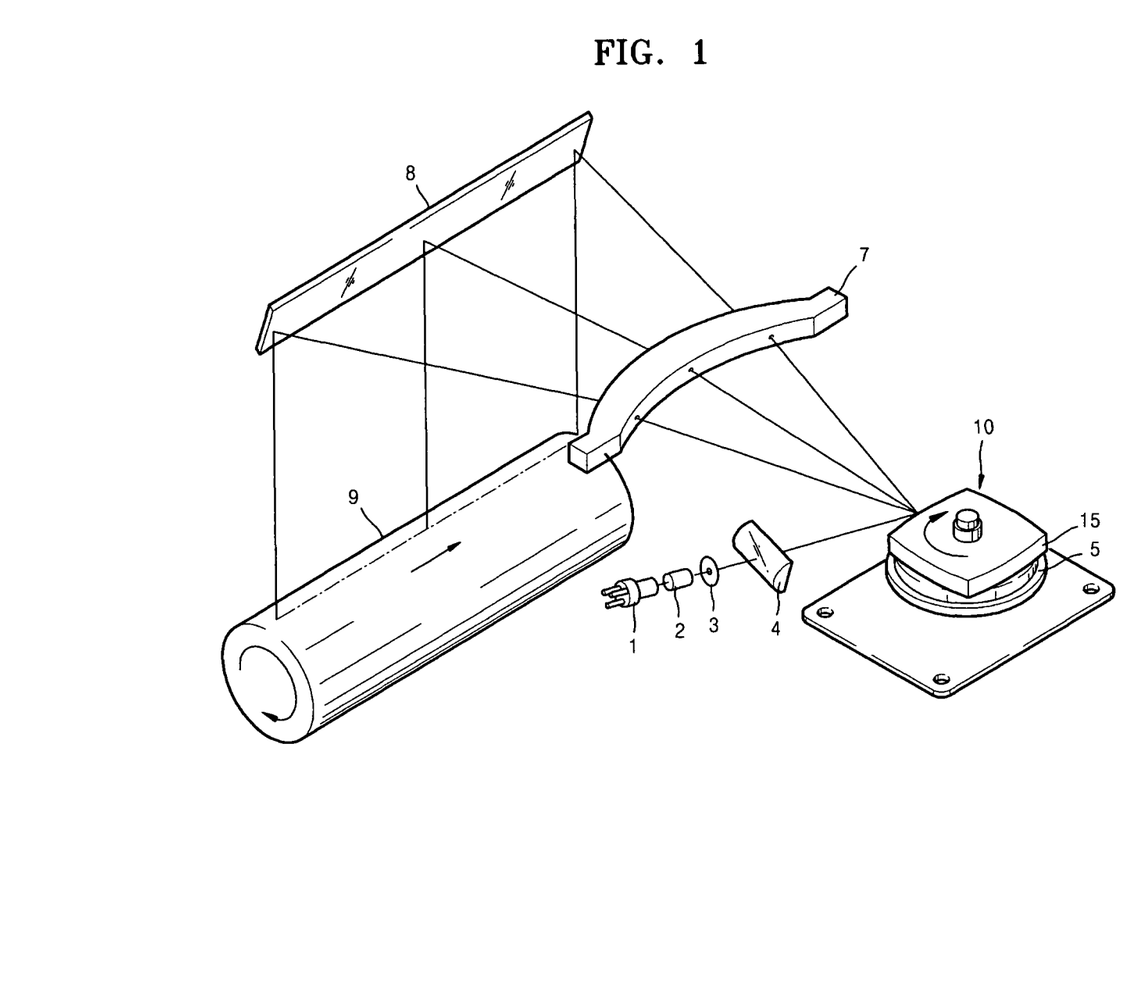
FIG. 1 is a schematic view of a light scanning unit according to an embodiment.
Figure 2:
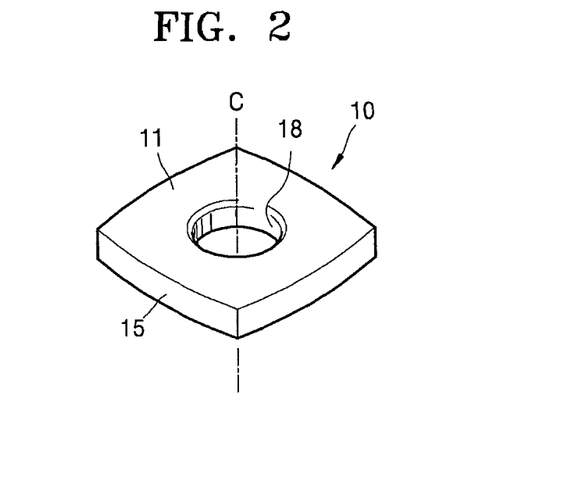
FIG. 2 is a schematic perspective view of a rotational polygon mirror employed in the light scanning unit of FIG. 1.

FIG. 1 is a schematic view of a light scanning unit employing a rotational polygon mirror according to an embodiment. FIG. 2 is a schematic perspective view of the rotational polygon mirror according to the present embodiment.

Referring to FIG. 1, the light scanning unit includes a light source 1, a rotational polygon mirror 10, and a scanning lens 7.

The light source 1 emits a light beam and may be a semiconductor laser diode for emitting a laser beam. The light source 1 may emit a single light beam or a plurality of light beams. FIG. 1 illustrates the light source 1 for emitting a single light beam. If the light source 1 emits a plurality of light beams, the light beams may be incident on one of a plurality of reflection surfaces 15 of the rotational polygon mirror 10 at different incident angles or incident on a plurality of the reflection surfaces 15.

A collimating lens 2 may be disposed on an optical path between the light source 1 and the rotational polygon mirror 10. The collimating lens 2 collimates light emitted from the light source 1. A cylindrical lens 4 may further be disposed on an optical path between the collimating lens 2 and the rotational polygon mirror 10. The cylindrical lens 4, that is, an optical unit having a predetermined power in only a sub scanning direction, focuses a light beam from the collimating lens 2 onto a deflection surface of the rotational polygon mirror 10 in the sub scanning direction. An aperture stopper 3 may further be disposed between the collimating lens 2 and the cylindrical lens 4 to adjust a diameter of a light beam. The collimating lens 2, the aperture stopper 3, and the cylindrical lens 4 constitute an incident optical unit of the light scanning unit.

The scanning lens 7, that is, an imaging optical unit having a convergence function and fθ lens characteristics, images a light beam that is deflected and scanned by the rotational polygon mirror 10 onto an outer circumferential surface of a photoreceptor 9 at a constant speed. FIG. 1 illustrates one scanning lens 7 as the imaging optical unit. However, the imaging optical unit may include two or more lenses. A mirror 8 is an example of an optical path changing unit that changes an optical path of a scanned light beam.

The rotational polygon mirror 10 includes the reflection surfaces 15 and rotates at a constant speed by a spindle motor 5. Each reflection surface 15 has a curved surface in which a central portion is convexed, which will be described later, and has a flat surface as the rotational polygon mirror 10 rotates. A light beam emitted from the light source 1 is scanned onto the outer circumferential surface of the photoreceptor 9 in a main scanning direction by the rotation of the rotational polygdn mirror 10. In this regard, the main scanning direction refers to a direction in which a beam spot of the light beam imaged on the photoreceptor 9 proceeds according to the rotation of the rotational polygon mirror 10. The main scanning direction is perpendicular to a rotation axis C (FIG. 2) of the rotational polygon mirror 10. If the photoreceptor 9 is a photosensitive drum as shown in FIG. 1, the main scanning direction is a direction parallel to a central axis of the photosensitive drum.

Referring to FIG. 2, the rotational polygon mirror 10 may have four reflection surfaces 15, and a central portion thereof may have a hole 18 to be connected to the spindle motor 5 (FIG. 1). A body 11 of the rotational polygon mirror 10 may be formed of plastic such as epoxy. Meanwhile, the reflection surfaces 15 may be a metal layer with high reflectivity formed of, for example, aluminum (Al) or silver (Ag). A protective layer formed of $SiO_2$ may further be formed on the metal layer to protect the metal layer from external elements and to prevent oxidation of the metal layer. In addition, an adhesive layer may further be interposed between the metal layer and the body 11 to improve adhesion therebetween.

Referring back to FIG. 1, an operation of the light scanning unit will be described.

Light emitted from the light source 1 sequentially passes through the collimating lens 2, the aperture stopper 3, and the cylindrical lens 4 and arrives at the rotational polygon mirror 10. The light is reflected by the rotational polygon mirror 10, passes through the scanning lens 7, is reflected by the mirror 8, and arrives at the outer circumferential surface of the photoreceptor 9. Thus, an electrostatic latent image is formed on the photoreceptor 9 by controlling on-off of the light source 1 to form exposed regions and unexposed regions. While the light scanning unit operates, the rotational polygon mirror 10 rotates by the spindle motor 5, and the convex reflection surfaces 15 become flat by a centrifugal force.

Figure 3:
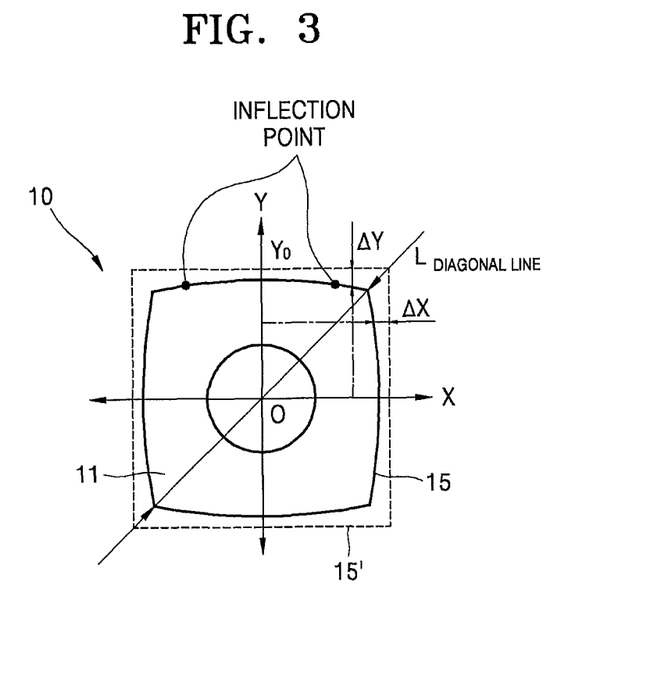
FIG. 3 is a cross-sectional view of the rotational polygon mirror of FIG. 2 when the rotational polygon mirror is not rotating and when the rotational polygon mirror is deformed while rotating.
Figure 4:
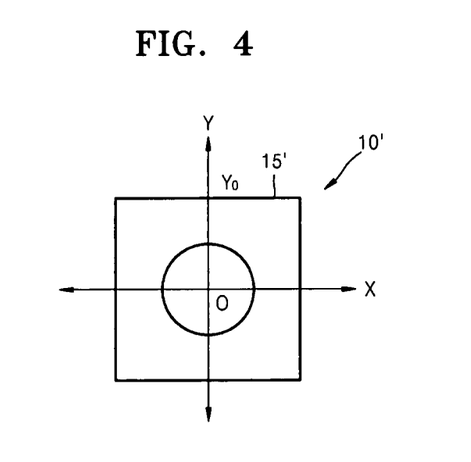
FIG. 4 is a plan view of a rotational polygon mirror having a reference cross-sectional profile.
Figure 5:
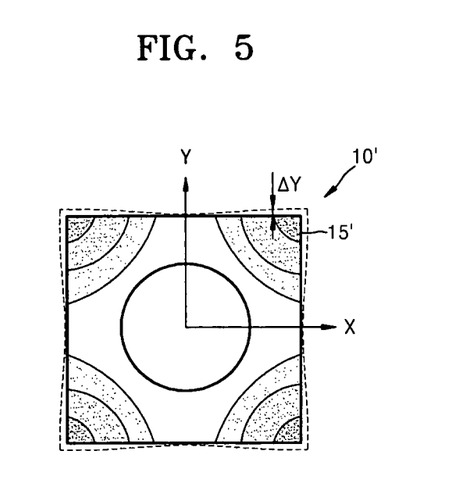
FIG. 5 is a histogram illustrating deformation degrees of the rotational polygon mirror of FIG. 4 as the rotational polygon mirror rotates.

Referring to FIGS. 3 to 5, cross-sectional profiles of the reflection surfaces 15 of the rotational polygon mirror 10 will be described in detail.

FIG. 3 is a cross-sectional view of the rotational polygon mirror 10 of FIG. 2 perpendicular to the rotation axis C of FIG. 2. Referring to FIG. 3, the rotational polygon mirror 10 may be deformed by a centrifugal force as the rotational polygon mirror 10 rotates. Since the body 11 of the rotational polygon mirror 10 is formed of plastic, the body 11 may be deformed seriously. The deformation of the rotational polygon mirror 10 may be restored when the rotation is stopped. However, the rotational polygon mirror 10 may be permanently deformed as a result of deformation accumulation. In FIG. 3, a solid line indicates a cross-sectional view of the rotational polygon mirror 10 when the rotational polygon mirror 10 is not rotating, and a dashed line indicates a cross-sectional view of the rotational polygon mirror 10 when the rotational polygon mirror 10 is rotating. In the cross-sectional views of the rotational polygon mirror 10, each side indicates one reflection surface 15 or 15'.

The body 11 of the rotational polygon mirror 10 according to the present embodiment has a rotation polygon shape formed in such a way that the central portion of each reflection surface 15 is convexed in a cross-sectional view perpendicular to the rotation axis C as shown in FIG. 3. That is, the central portion of each reflection surface 15 has a curved surface with a central convex portion. Furthermore, the cross-sectional profile of each reflection surface 15 has at least 2 inflection points in a cross-sectional view perpendicular to the rotation axis C as shown in FIG. 3.

A cross-sectional profile Y(X) of the upper side may satisfy Formula 1 below.

$$Y(X) = AX^4 + BX^2 + C \qquad \text{Formula 1}$$

As defined in Formula 1, the cross-sectional profile Y(X) of the upper side is represented by a quark equation, which is a polynomial equation of even degree, and thereby symmetrical about a Y-axis. If necessary, the cross-sectional profile Y(X) may be expressed as a fourth or higher degree polynomial equation. In this regard, coefficients A, B, and C are determined according to physical properties and rotation speed of the rotational polygon mirror 10 and may satisfy Formula 2 below.

$$0 < \sqrt{-\frac{B}{6A}} < C\tan\frac{180°}{N} \qquad \text{Formula 2}$$

In this regard, N is the number of reflection surfaces 15. According to the present embodiment, N=4. According to Formula 2, the cross-sectional profile Y(X) of the upper side has two inflection points.

Meanwhile, since the rotational polygon mirror 10 has rotational symmetry, the cross-sectional profiles of the other reflection surfaces 15 may be expressed by substantially the same formula as the cross-sectional profile Y(X). For an example, the cross-sectional profile X(Y) of the right side may be represented by substantially the same formula as Formulae 1 and 2 except that X and Y are interchanged.

If the cross-sectional profiles of the reflection surfaces 15 satisfy Formulae 1 and 2, the convex cross-sectional profile of each reflection surface 15 is deformed into a flat shape by a centrifugal force while the rotational polygon mirror 10 rotates. Accordingly, the rotational polygon mirror 10 has flat reflection surfaces 15' required for the light scanning unit during a real operation.

The cross-sectional profiles of the reflection surfaces 15 may be determined as follows.

FIG. 4 is a plan view of a virtual rotational polygon mirror 10' including the reflection surfaces 15' with a reference cross-sectional profile $Y_0$. The reference cross-sectional profile $Y_0$ is an ideal cross-sectional profile while the light scanning unit operates. In other words, a reference cross-sectional profile $Y_0$ is cross-sectional profiles of the reflection surfaces 15', which are flat while the rotational polygon mirror 10 rotates in FIG. 3. In FIG. 3, if a point on the rotation axis C is an origin (O), an axis from a central point of the upper side to the origin (O) is the Y axis, and an axis perpendicular to the Y axis and passing through the origin (O) is an X axis, the reference cross-sectional profile $Y_0$ is a constant which is half a length of one side of the rotational polygon mirror 10'.

FIG. 5 is a histogram illustrating deformation degrees of the virtual rotational polygon mirror 10' as the virtual rotational polygon mirror 10' rotates. In FIG. 5, a solid line indicates a cross-sectional view of the virtual rotational polygon mirror 10' when the virtual rotational polygon mirror 10' is not rotating, and a dashed line indicates a cross-sectional view of the virtual rotational polygon mirror 10' when the virtual rotational polygon mirror 10' is rotating.

Referring to FIG. 5, the virtual rotational polygon mirror 10' has relatively small deformation degrees near the X-axis and the Y-axis while rotating, and has deformation degrees that increase toward edges. Since a centrifugal force increases as distance from the rotation axis C increases, the edges of the virtual rotational polygon mirror 10' are subjected to a higher centrifugal force than a center thereof, and thus the virtual rotational polygon mirror 10' has deformation degrees that increase toward the edges. A variation ΔY(X) of one reflection surface 15', for example, an upper side of the virtual rotational polygon mirror 10', may be obtained by simulation. The variation ΔY(X) of the reflection surface 15' may be determined by physical properties such as shape, size, Young's modulus, Poisson's ratio, density, and rotation speed of the virtual rotational polygon mirror 10'. Since the cross-sectional profiles Y(X) of the reflection surfaces 15 of the rotational polygon mirror 10 may be represented by a quartic equation such as Formula 1, the variation ΔY(X) may be represented by a quartic equation. In this regard, the variation ΔY(X) may be defined in Formula 3 below, according to Formula 1.

$$\Delta Y(X) = A'X^4 + B'X^2 + C' = -AX^4 - BX^2 + Y_0 - C \qquad \text{Formula 3}$$

As described above, if the variation ΔY(X) of the reflection surface 15' of the virtual rotational polygon mirror 10' is obtained, the cross-sectional profiles Y(X) of the reflection surfaces 15 of the rotational polygon mirror 10 according to the present embodiment may be defined in Formula 4.

$$Y_0 - \Delta Y(X) - 0.2\ \mu m \leq Y(X) \leq Y_0 - \Delta Y(X) + 0.2\ \mu m \qquad \text{Formula 4}$$

Here, ±0.2 μm refers to tolerance.

Furthermore, the cross-sectional profile Y(X) of the reflection surface 15 of the rotational polygon mirror 10 according to the present embodiment may be designed to have a stricter tolerance as shown in Formula 5 below.

$$Y_0 - \Delta Y(X) - 0.1\ \mu m \leq Y(X) \leq Y_0 - \Delta Y(X) + 0.1\ \mu m \qquad \text{Formula 5}$$

If the cross-sectional profiles of the reflection surfaces 15 of the rotational polygon mirror 10 according to the present embodiment are corrected to satisfy Formula 3 or 4, deterioration of optical properties obtained during a high-speed rotation of the rotational polygon mirror 10 and printing quality of an image forming apparatus may be reduced.

Hereinafter, the rotational polygon mirror 10 will be described in detail with reference to FIGS. 6A, 6B, 7A and 7B.

Physical properties of the virtual rotational polygon mirror 10' shown in FIG. 4 are listed in Table 1 below.

TABLE 1

| | |
|---|---|
| Shape of rotational polygon mirror | Mirror with 4 surfaces (square) Length of diagonal line: 20 mm Thickness of mirror: 2.5 mm Hole: 8 mm |
| Young's modulus | $2.30 * 10^3$ MPa |
| Poisson's ratio | 0.38 |
| Density | $1.20 * 10^{-6}$ kg/mm³ |

Figure 6A:
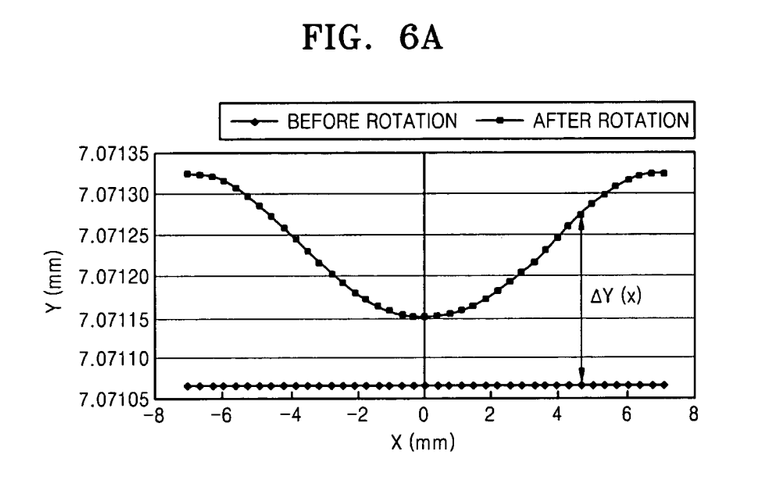
FIG. 6A is a graph illustrating a cross-sectional profile of the rotational polygon mirror of FIG. 4 as the rotational polygon mirror rotates at 40,000 rpm.
Figure 6B:
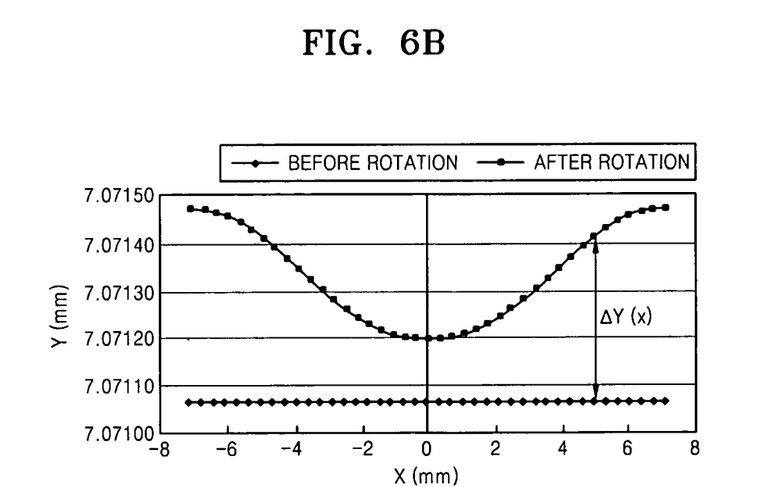
FIG. 6B is a graph illustrating a cross-sectional profile of the rotational polygon mirror of FIG. 4 as the rotational polygon mirror rotates at 50,000 rpm.

FIG. 6A is a graph illustrating a cross-sectional profile Y(X) of the virtual rotational polygon mirror 10' having the physical properties shown in Table 1 as the virtual rotational polygon mirror 10' rotates at 40,000 rpm. FIG. 6B is a graph illustrating a simulated cross-sectional profile Y(X) of the virtual rotational polygon mirror 10' as the virtual rotational polygon mirror 10' rotates at 50,000 rpm;

In FIGS. 6A and 6B, a reference cross-sectional profile $Y_0$ is 7.071068 mm before rotation, and a variation $\Delta Y(X)$ of the cross-sectional profile Y(X) of the virtual rotational polygon mirror 10' after rotation satisfies Formula 3. In this regard, coefficients A', B' and C' may be close to those shown in Table 2 below.

TABLE 2

|    | 40,000 rpm           | 50,000 rpm           |
|----|----------------------|----------------------|
| A' | $-8.212225 * 10^{-8}$ | $-1.283171 * 10^{-7}$ |
| B' | $+7.592694 * 10^{-6}$ | $+1.186362 * 10^{-5}$ |
| C' | $+0.000082$          | $+0.000129$          |

Coefficients A, B, and C of the cross-sectional profile Y(X) of the reflection surface 15 satisfying Formula 1 are shown in Table 3 below in consideration of the relationship with Formula 3 with reference to the variation $\Delta Y(X)$ shown in Table 2.

TABLE 3

|   | 40,000 rpm           | 50,000 rpm           |
|---|----------------------|----------------------|
| A | $8.212225 * 10^{-8}$  | $1.283171 * 10^{-7}$  |
| B | $-7.592694 * 10^{-6}$ | $-1.186362 * 10^{-5}$ |
| C | $7.070985$           | $7.070939$           |

The coefficients A, B, and C shown in Table 3 satisfy Formula 2.

Figure 7A:
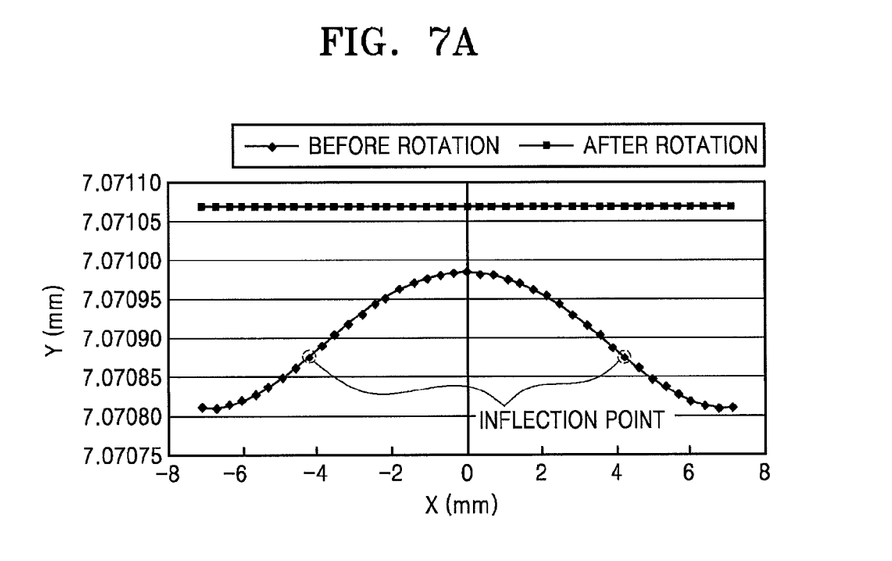
FIG. 7A is a graph illustrating a cross-sectional profile of a rotational polygon mirror according to an embodiment as the rotational polygon mirror rotates at 40,000 rpm.
Figure 7B:
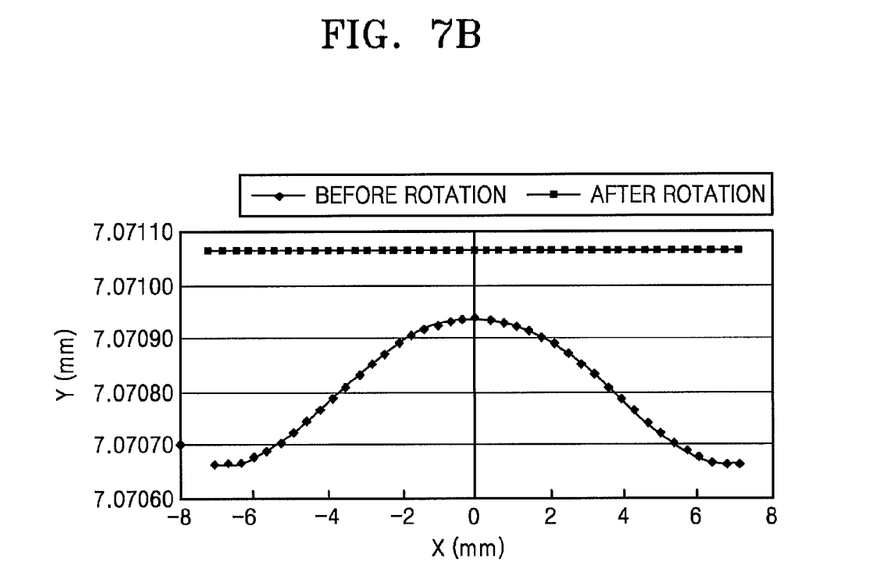
FIG. 7B is a graph illustrating a cross-sectional profile of a rotational polygon mirror according to an embodiment as the rotational polygon mirror rotates at 50,000 rpm.

FIG. 7A is a graph illustrating a cross-sectional profile of the rotational polygon mirror 10 according to the present embodiment as the rotational polygon mirror 10 rotates at 40,000 rpm, and FIG. 7B is a graph illustrating a cross-sectional profile of the rotational polygon mirror 10 according to the present embodiment as the rotational polygon mirror 10 rotates at 50,000 rpm. Referring to FIGS. 7A and 7B, the cross-sectional profile Y(X) of the reflection surface 15 has a convex shape with 2 inflection points before rotation but is deformed to have a flat shape corresponding to the reference cross-sectional profile $Y_0$ after rotation.

Figure 8:
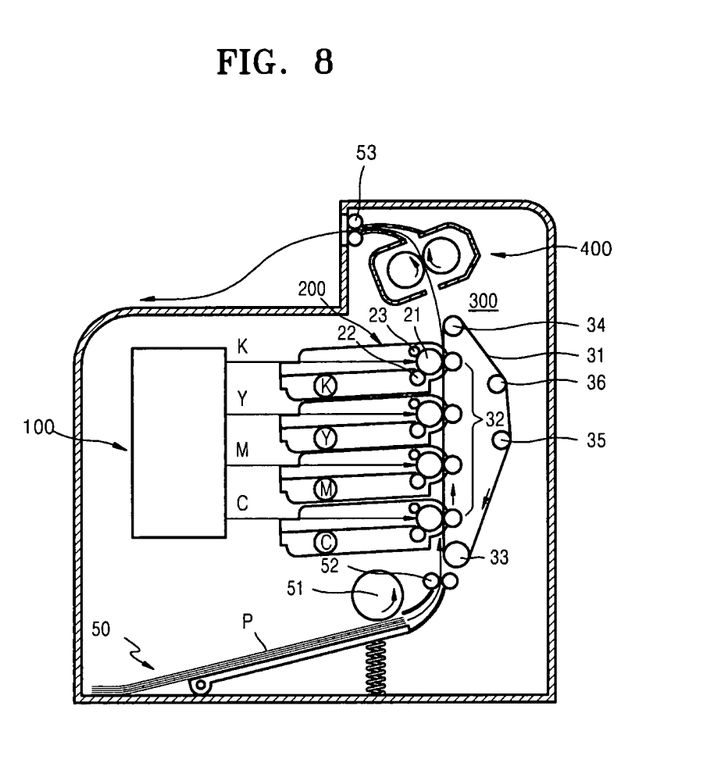
FIG. 8 is a schematic view of an electrophotographic image forming apparatus according to an embodiment.

FIG. 8 is a schematic view of an image forming apparatus employing the light scanning unit according to the present embodiment.

The image forming apparatus of FIG. 8 is a dry electrophotographic image forming apparatus that prints a color image using a dry developer (hereinafter, referred to as a toner).

The image forming apparatus includes a light scanning unit 100, a plurality of developing units 200, a transfer unit 300, and a fixing unit 400.

The light scanning unit 100 may be the light scanning unit described above. In order to print a color image, the light scanning unit 100 scans a plurality of light beams, and the plurality of developing units 200, one for each color may be formed to correspond to the plurality of light beams. In this regard, the light scanning unit 100 may include a plurality of light scanning units or may simultaneously scan a plurality of light beams using one rotational polygon mirror 10 (FIG. 1) as described above with reference to FIG. 1. For example, the light scanning unit 100 may scan four light beams corresponding to black (K), magenta (M), yellow (Y), and cyan (C), and four developing units 200 for black (K), magenta (M), yellow (Y), and cyan (C) may be formed.

The developing units 200 each include a photosensitive drum 21, that is, an image receptor, on which an electrostatic latent image is formed and a developing roller 22 for developing the electrostatic latent image.

The photosensitive drum 21, that is, a photoreceptor, may be a cylindrical metal pipe having a photosensitive layer that has a predetermined thickness and is formed on an outer circumference of the cylindrical metal pipe. Although not shown herein, a photosensitive belt may be employed as the photoreceptor. The outer circumference of the photosensitive drum 21 is a surface that is to be exposed. A charge roller 23 is disposed on the outer circumference of the photosensitive drum 21 on an upstream portion of a region that is to be exposed to the light scanning unit 100. The charge roller 23 is a charging unit that contacts the photosensitive drum 21 and rotates to charge the surface of the photosensitive drum with a uniform charge. A charge bias is applied to the charge roller 23. A corona charging unit (not shown) may be used instead of the charge roller 23.

The developing roller 22 having toner adhered to its outer circumference supplies toner to the photosensitive drum 21. A development bias is applied to the developing roller 22 to supply toner to the photosensitive drum 21. Although it is not illustrated in the drawings, the developing units 200 may further include a supply roller for allowing the toner contained in the developing units 200 to adhere to the developing roller 22, a restriction unit for restricting an amount of the toner adhered to the developing roller 22, and an agitator for transferring the toner contained in each of the developing units 200 to the supply roller and/or the developing roller 22.

The transfer unit 300 may include a paper transfer belt 31 and four transfer rollers 32. The paper transfer belt 31 is arranged to face a region of the outer circumference of the photosensitive drum 21 exposed out of the developing unit 200. The paper transfer belt 31 circulates by being supported by a plurality of support rollers 33, 34, 35, and 36. The four transfer rollers 32 are arranged to face the photosensitive drum 21 of each developing unit 200 with the paper transfer belt 31 interposed therebetween. A transfer bias is applied to each of the transfer rollers 32.

A color image forming process that may be performed the electrophotographic image forming apparatus configured as above will be described, The photosensitive drum 21 of the developing unit 200 is charged to a uniform electric potential by a charge bias applied to the charge roller 23. The light scanning unit 100 scans four light beams corresponding to image information of cyan (C), magenta (M), yellow (Y), and black (K) colors to each photosensitive drum 21 of the developing units 200 to form an electrostatic latent image. A development bias is applied to the developing roller 22. Then, toner adhered to the outer circumference of the developing roller 22 adheres to the electrostatic latent image on the photosensitive drum 21 so that toner images of cyan, magenta, yellow, and black may be respectively formed on the photosensitive drum 21 of the developing unit 200.

A medium that finally receives the toner image, for example, paper P, is ejected from a cassette 50 by a pickup roller 51. The paper P is transferred to the paper transfer belt 51 by a transfer roller 52. The paper P adheres to a surface of the paper transfer belt 31 due to an electrostatic force and is transferred at the same velocity as a running linear velocity of the paper transfer belt 31.

For example, a leading end of the paper P arrives at a transfer nip at the same time as when a leading end of a toner image of cyan (C) formed on the outer circumferential surface of one photosensitive drum 21 of one developing unit 200 arrives at the transfer nip facing the transfer roller 32. When a transfer bias is applied to the transfer roller 32, the toner image formed on the photosensitive drum 21 is transferred to the paper P. As the paper P is transferred, toner images of magenta (M), yellow (Y), and black (K) formed on the photosensitive drums 21 of the other developing units 200 are sequentially transferred to the paper P to overlap with one another. Accordingly, a color toner image is formed on the paper P.

The color toner image transferred to the paper P is maintained on a surface of the paper P due to an electrostatic force. The fixing device 400 fixes the color toner image on the paper P using heat and pressure. The paper P after being subjected to the fixing process is ejected out of the image forming apparatus by an eject roller 53.

Deterioration of performances of the rotational polygon mirror and the light scanning unit employing the rotational polygon mirror may be reduced by correcting deformation caused by rotation.

While the rotational polygon mirror and the light scanning unit employing the rotational polygon mirror have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A rotational polygon mirror comprising:
a plurality of reflection surfaces that rotate with respect to a rotation axis,
wherein each of the reflection surfaces has a convex shape and a cross-sectional profile perpendicular to the rotation axis having at least two inflection points when in a non-rotating state and each of the reflection surfaces is configured to have a flat surface when in a rotating state.

2. The rotational polygon mirror of claim 1, wherein each of the plurality of reflection surfaces has a cross-sectional profile Y(X) that satisfies the following formula, when a line from a center of the cross-sectional profile to a point on the rotation axis is a Y axis and a line perpendicular to the Y axis and passing through the point on the rotation axis is an X axis in a cross-section perpendicular to the rotation axis:

$Y(X)=AX^4+BX^2+C$, and coefficients A, B, and C of the cross-sectional profile Y(X) satisfy the following formula in order that the cross-sectional profile Y(X) has two inflection points:

$0<\sqrt{(-B/6A)}<C\cdot\tan(180°/N)$ where N is the number of the reflection surfaces.

3. The rotational polygon mirror of claim 2, wherein the coefficients A, B, and C of the cross-sectional profile Y(X) are determined by physical properties and a rotation speed of the rotational polygon mirror.

4. The rotational polygon mirror of claim 1, wherein each of the plurality of reflection surfaces has a cross-sectional profile Y(X) which satisfies the following formula, when a line from a center of the cross-sectional profile to a point on the rotation axis is a Y axis, and a line perpendicular to the Y axis and passing through a point on the rotation axis is an X axis in a cross-section perpendicular to the rotation axis, and a variation of the cross-sectional profile of each reflection surface deformed by a rotation with respect to a constant $Y_0$ as a reference cross-sectional profile determined by a size of the rotational polygon mirror is $\Delta Y(X)$:

$Y_0-\Delta Y(X)-0.2 \mu m \leq Y(X) \leq Y_0-\Delta Y(X)+0.2 \mu m$.

5. The rotational polygon mirror of claim 4, wherein each of the plurality of reflection surfaces has a cross-sectional profile Y(X) which satisfies the following formula:

$Y_0-\Delta Y(X)-0.1 \mu m \leq Y(X) \leq Y_0-\Delta Y(X)+0.1 \mu m$.

6. The rotational polygon mirror of claim 4, wherein the variation $\Delta Y(X)$ satisfies the following formula:

$\Delta Y(X)=-AX^4-BX^2+Y_0-C$, and coefficients A, B, and C of the cross-sectional profile Y(X) satisfy the following formula in order that the cross-sectional profile Y(X) has two inflection points:

$0 \leq \sqrt{(-B/6A)} \leq C\cdot\tan(180°/N)$ where N is the number of the reflection surfaces.

7. The rotational polygon mirror of claim 6, wherein the coefficients A, B, and C of the cross-sectional profile Y(X) are determined by physical properties and a rotation speed of the rotational polygon mirror.

8. The rotational polygon mirror of claim 1, wherein a number of the plurality of reflection surfaces is four, a length of diagonal line of the rotational polygon mirror is 20 mm, and a thickness of the rotational polygon mirror is 2.5 mm.

9. The rotational polygon mirror of claim 1, wherein the rotational polygon mirror is formed of plastic.

10. The rotational polygon mirror of claim 9, wherein the plurality of reflection surfaces are coated with a reflection layer.

11. A light scanning unit comprising:
a light source that emits a light beam;
a rotational polygon mirror that deflects the light beam emitted from the light source in a main scanning direction; and
an imaging optical unit that images the light beam deflected by the rotational polygon mirror onto a surface being scanned,
wherein the rotational polygon mirror comprises a plurality of reflection surfaces that rotate with respect to a rotation axis, and
wherein each of the reflection surfaces has a convex shape and a cross-sectional profile perpendicular to the rotation axis having at least two inflection points when the rotational polygon mirror is in a non-rotating state and each of the reflection surfaces is configured to have a flat surface when in a rotating state.

12. The light scanning unit of claim 11, wherein each of the plurality of reflection surfaces has a cross-sectional profile Y(X) that satisfies the following formula, when a line from a center of the cross-sectional profile to a point on the rotation axis is a Y axis and a line perpendicular to the Y axis and passing through the point on the rotation axis is an X axis in a cross-section perpendicular to the rotation axis:

$Y(X)=AX^4+BX^2+$, and coefficients A, B, and C of the cross-sectional profile Y(X) satisfy the following formula in order that the cross-sectional profile Y(X) has two inflection points:

$0<\sqrt{(-B/6A)}<C\cdot\tan(180°/N)$ where N is the number of the reflection surfaces.

13. The light scanning unit of claim 12, wherein the coefficients A, B, and C of the cross-sectional profile Y(X) are determined by physical properties and a rotation speed of the rotational polygon mirror.

14. The light scanning unit of claim 11, wherein each of the plurality of reflection surfaces has a cross-sectional profile Y(X) which satisfies the following formula, when a line from a center of the cross-sectional profile to a point on the rotation axis is a Y axis, and a line perpendicular to the Y axis and passing through the point on the rotation axis is an X axis in a cross-section perpendicular to the rotation axis, and a variation of the cross-sectional profile of each reflection surface deformed by a rotation with respect to a constant $Y_0$ as a reference cross-sectional profile determined by a size of the rotational polygon mirror is $\Delta Y(X)$:

$$Y_0 - \Delta Y(X) - 0.2 \; \mu m \leq Y(X) \leq Y_0 - \Delta Y(X) + 0.2 \; \mu m.$$

15. The light scanning unit of claim 14, wherein each of the plurality of reflection surfaces has a cross-sectional profile $Y(X)$ which satisfies the following formula:

$$Y_0 - \Delta Y(X) - 0.1 \; \mu m \leq Y(X) \leq Y_0 - \Delta Y(X) + 0.1 \; \mu m.$$

16. The light scanning unit of claim 14, wherein the variation $\Delta Y(X)$ satisfies the following formula:

$$\Delta Y(X) = -AX^4 + Y_0 - C, \text{ and}$$

coefficients A, B, and C of the cross-sectional profile $Y(X)$ satisfy the following formula in order that the cross-sectional profile $Y(X)$ has two inflection points:

$$0 \leq \sqrt{(-B/6A)} \leq C \cdot \tan(180°/N)$$

where N is the number of the reflection surfaces.

17. The light scanning unit of claim 16, wherein the coefficients A, B, and C of the cross-sectional profile $Y(X)$ are determined by physical properties and a rotation speed of the rotational polygon mirror.

18. The light scanning unit of claim 11, wherein a number of the plurality of reflection surfaces is four, a length of diagonal line of the rotational polygon mirror is 20 mm, and a thickness of the rotational polygon mirror is 2.5 mm.

19. The light scanning unit of claim 11, wherein the rotational polygon mirror is formed of plastic.

20. The light scanning unit of claim 19, wherein the plurality of reflection surfaces are coated with a reflection layer.

21. An image forming apparatus comprising:
a light scanning unit comprising a light source that emits a light beam; a rotational polygon mirror that deflects the light beam emitted from the light source in a main scanning direction; and an imaging optical unit that images the light beam deflected by the rotational polygon mirror onto a surface being scanned;

a developing unit comprising a photoreceptor that is disposed at a region where an electrostatic image is formed by the light beam emitted from the light scanning unit wherein an electrostatic latent image is formed on the photoreceptor, and a developing roller that develops the electrostatic latent image formed on the photoreceptor; and a transfer unit that transfers the image developed by the developing unit, wherein the rotational polygon mirror comprises a plurality of reflection surfaces that rotate with respect to a rotation axis, wherein each of the reflection surfaces has a convex shape and a cross-sectional profile perpendicular to the rotation axis having at least two inflection points when the rotational polygon mirror is in a non-rotating state and each of the reflection surfaces is configured to have a flat surface when in a rotating state.

22. The image forming apparatus of claim 21, wherein each of the plurality of reflection surfaces has a cross-sectional profile $Y(X)$ that satisfies the following formula, when a line from a center of the cross-sectional profile to a point on the rotation axis is a Y axis and a line perpendicular to an Y axis and passing through the point on the rotation axis is the X axis in a cross-section perpendicular to the rotation axis:

$$Y(X) = AX^4 + BX^2 + C, \text{ and}$$

coefficients A, B, and C of the cross-sectional profile $Y(X)$ satisfy the following formula in order that the cross-sectional profile $Y(X)$ has two inflection points:

$$0 < \sqrt{(-B/6A)} < C \cdot \tan(180°/N)$$

where N is the number of the reflection surfaces.

* * * * *

UNITED STATES PATENT AND TRADEMARK OFFICE
CERTIFICATE OF CORRECTION

PATENT NO. : 8,922,606 B2  
APPLICATION NO. : 13/064799  
DATED : December 30, 2014  
INVENTOR(S) : Heon-hee Lim Page 1 of 1

It is certified that error appears in the above-identified patent and that said Letters Patent is hereby corrected as shown below:

In the Claims

Claim 12, Column 10, line 53 (Approx.):

Delete "$Y(X)=AX^4+BX^2+,$"

insert -- $Y(X)=AX^4+BX^2+C,$ --, therefor.

Claim 16, Column 11, Line 17 (Approx.):

Delete "$\Delta Y(X)=-AX^4+Y_0-C,$"

insert -- $\Delta Y(X)=-AX^4-BX^2+Y_0-C,$ --, therefor.

Signed and Sealed this  
Seventh Day of July, 2015

Michelle K. Lee  
*Director of the United States Patent and Trademark Office*